US008489092B2

(12) United States Patent
Mahajan et al.

(10) Patent No.: US 8,489,092 B2
(45) Date of Patent: Jul. 16, 2013

(54) SYSTEM INFORMATION COLLECTION WHILE CAMPING ON A CELL

(75) Inventors: Amit Mahajan, San Diego, CA (US); Vanitha A. Kumar, San Diego, CA (US); Daniel Amerga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 595 days.

(21) Appl. No.: 12/773,817

(22) Filed: May 4, 2010

(65) Prior Publication Data

US 2011/0117912 A1 May 19, 2011

Related U.S. Application Data

(60) Provisional application No. 61/262,007, filed on Nov. 17, 2009.

(51) Int. Cl.
*H04W 4/00* (2009.01)

(52) U.S. Cl.
USPC ........ 455/434; 455/418; 455/436; 455/404.1; 455/450; 455/458; 370/328; 370/335; 370/311; 370/312

(58) Field of Classification Search
USPC .............. 455/418, 434, 436, 404.1, 450, 458; 370/328, 335, 312
See application file for complete search history.

(56) References Cited

U.S. PATENT DOCUMENTS

| | | | |
|---|---|---|---|
| 2009/0181661 A1 | 7/2009 | Kitazoe et al. | |
| 2009/0318128 A1* | 12/2009 | Narasimha et al. | ........ 455/422.1 |
| 2010/0075625 A1* | 3/2010 | Wu | ............. 455/404.1 |

FOREIGN PATENT DOCUMENTS

| WO | WO2007127942 | * | 8/2007 |
|---|---|---|---|
| WO | WO2009058752 A1 | | 5/2009 |

OTHER PUBLICATIONS

3GPP Draft; R2-081029 LTE MCCH_Trans_R0, 3rd Generation Partnership Project (3GPP), Mobile Competence Centre; 650, Route Des Lucioles; F-06921 Sophia-Antipolis Cedex; France, vol. RAN WG2, No. Sorrento, Italy; Feb. 4, 2008, XP050138820. [retrieved on Feb. 4, 2008].

International Search Report and Written Opinion—PCT/US2010/057052—International Search Authority, European Patent Office, Jan. 26, 2011.

(Continued)

*Primary Examiner* — Manpreet Matharu
(74) *Attorney, Agent, or Firm* — Kam T. Tam

(57) ABSTRACT

Systems and methodologies are described that facilitate collecting consistent system information when entering a cell during cell selection and/or cell re-selection in a wireless communication environment. SIB(s) can be received while lacking modification period information (e.g., modification period boundary, modification period duration, . . . ). Further, the SIB(s) can be stored in memory with corresponding SFN(s) at which the SIB(s) are respectively received. Thereafter, the modification period information can be identified (e.g., from a SIB2, . . . ). Moreover, an evaluation can be effectuated to determine whether to retain or discard the SIB(s) from memory as a function of the modification period information and the corresponding SFN(s). Further, whether to retain or discard the SIB(s) from memory can be based upon a value tag. According to another example, subsequent reception of the SIB(s) can be inhibited within a minimum modification period employed as a default prior to identifying the modification period information.

32 Claims, 12 Drawing Sheets

OTHER PUBLICATIONS

Siemens: "Identification that receiving MBMS RB information is complete", 3GPP Draft; R2-050523, 3rd Generation Partnership Project (3GPP), Mobile competence Centre ; 650, Route Des Lucioles ; F-06921 Sophia-Antipolis Cedex ; France, vol. RAN WG2, No. Scottsdale, USA; Feb. 10, 2005, XP050127768 [retrieved on Feb. 10, 2005].

"3rd Generation Partnership Project; Technical Specification Group Radio Access Network; Evolved Universal Terrestrial Radio Access (E-UTRA) Radio Resource Control (RRC); Protocol specification" (Release 8) 3GPP TS 36.331 V8.8.0 (Dec. 2009).

"3rd Generation Partnership Project; Technical Specification Group Radio Access Network; Evolved Universal Terrestrial Radio Access (E-UTRA); User Equipment (UE) procedures in idle mode" (Release 8) 3GPP TS 36.304 V8.8,0 (Dec. 2009).

* cited by examiner

SYSTEM INFORMATION COLLECTION WHILE CAMPING ON A CELL

CROSS-REFERENCE TO RELATED APPLICATIONS

This application claims the benefit of U.S. Provisional Patent Application Ser. No. 61/262,007 entitled "SYSTEM INFORMATION COLLECTION WHILE CAMPING ON A CELL" which was filed Nov. 17, 2009. The entirety of the aforementioned application is herein incorporated by reference.

BACKGROUND

I. Field

The following description relates generally to wireless communications, and more particularly to collecting consistent system information upon entering a cell in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, a multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from the reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Base stations in a wireless communication system can broadcast system information over a downlink. System information can indicate configuration and capability of a respective broadcasting base station. Further, system information can be received by an access terminal (or a plurality of access terminals).

System information for a base station can change at a modification period boundary. Typically, when an access terminal is camped on a base station and if system information is going to change in a next modification period (e.g., at a modification period boundary, ... ), then the access terminal is paged for a system update. Thus, the access terminal can recognize that system information is to change based upon the received page, and the access terminal can collect updated system information during the next modification period.

However, when system information is initially being collected by an access terminal (e.g., when the access terminal is entering a base station and/or trying to camp on such base station, ... ), the access terminal can be unaware of where a modification period boundary would be or if system information is going to change in a next modification period. For instance, under such a scenario, the access terminal can be unable to receive a page indicating system update. Conventional techniques oftentimes approach the foregoing by discarding system information received by the access terminal until modification period information is identified. Thereafter, upon identifying the modification period information, system information can be collected by the access terminal. Such an approach, however, can be inefficient and can yield delays associated with collecting system information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating collection of consistent system information when entering a cell during cell selection and/or cell re-selection in a wireless communication environment. SIB(s) can be received while lacking modification period information (e.g., modification period boundary, modification period duration, ... ). Further, the SIB(s) can be stored in memory with corresponding SFN(s) at which the SIB(s) are respectively received. Thereafter, the modification period information can be identified (e.g., from a SIB2, ... ). Moreover, an evaluation can be effectuated to determine whether to retain or discard the SIB(s) from memory as a function of the modification period information and the corresponding SFN(s). Further, whether to retain or discard the SIB(s) from memory can be based upon a value tag. According to another example, subsequent reception of the SIB(s) can be inhibited within a minimum modification period employed as a default prior to identifying the modification period information.

According to related aspects, a method that facilitates collecting system information in a wireless communication environment is described herein. The method can include entering a cell. Further, the method can include receiving a System Information Block (SIB) while lacking modification period information. Moreover, the method can include maintaining a local copy of the SIB along with a System Frame Number (SFN) at which the SIB is received. The method can also include identifying the modification period information subsequent to maintaining the local copy of the SIB. Further, the method can include evaluating whether to one of retain or discard the local copy of the SIB as a function of the modification period information and the SFN.

Another aspect relates to a wireless communications apparatus. The wireless communications apparatus can include a memory that retains instructions related to receiving a System Information Block (SIB) while lacking modification period information, storing a local copy of the SIB along with a System Frame Number (SFN) at which the SIB is received in the memory, extracting the modification period information subsequent to maintaining the local copy of the SIB, and analyzing whether to one of retain or discard the local copy of the SIB as a function of the modification period information and the SFN. Further, the wireless communications apparatus can include a processor, coupled to the memory, configured to execute the instructions retained in the memory.

Yet another aspect relates to a wireless communications apparatus that enables collecting system information upon entering a cell in a wireless communication environment. The wireless communications apparatus can include means for storing a local copy of a received System Information Block (SIB) and a System Frame Number (SFN) at which the SIB is received in memory prior to acquiring modification period information. Moreover, the wireless communications apparatus can include means for extracting the modification period information. Further, the wireless communications apparatus can include means for evaluating whether to one of retain or discard the local copy of the received SIB as a function of the modification period information and the SFN.

Still another aspect relates to a computer program product that can comprise a computer-readable medium. The computer-readable medium can include code for storing a local copy of a received System Information Block (SIB) and a System Frame Number (SFN) at which the SIB is received in memory prior to acquiring modification period information. The computer-readable medium can also include code for acquiring the modification period information. Moreover, the computer-readable medium can include code for analyzing whether to one of retain or discard the local copy of the received SIB as a function of the modification period information and the SFN.

In accordance with another aspect, a wireless communications apparatus can include a processor, wherein the processor can be configured to receive a System Information Block (SIB) while lacking modification period information. Moreover, the processor can be configured to maintain a local copy of the SIB along with a System Frame Number (SFN) at which the SIB is received. Still yet, the processor can be configured to identify the modification period information subsequent to maintaining the local copy of the SIB. Further, the processor can be configured to evaluate whether to one of retain or discard the local copy of the SIB as a function of the modification period information and the SFN.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
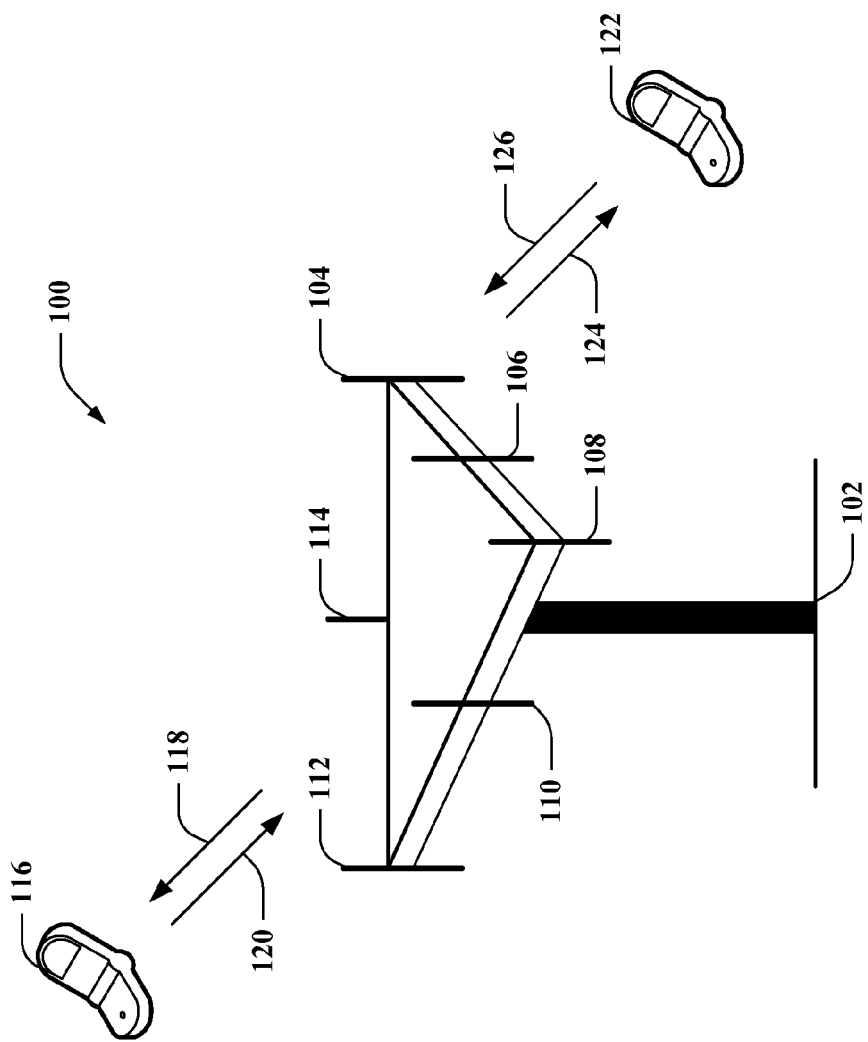
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can support optimized collection of system information by access terminal 116 and/or access terminal 122. For instance, base station 102 can broadcast system information. Moreover, system information can be altered over time (e.g., at a modification period boundary, ... ). When system information is to be changed in a next modification period, base station 102 can page access terminal(s) (e.g., access terminal 116, access terminal 122, ... ) camped thereupon for a system update. Base station 102 can thereafter broadcast updated system information during the next modification period (e.g., subsequent to a modification period boundary, ... ). Updated system information can thus be acquired by access terminal(s) camped on base station 102 that receive the page signifying the system update.

Further, one or more access terminals (e.g., access terminal 116, access terminal 122, ... ) can be initially collecting system information from base station 102 (e.g., during cell selection or cell re-selection, ... ) while entering base station 102 and/or attempting to camp on base station 102. The one or more access terminals initially collecting system information can be unaware of modification period boundaries, modification period duration, and the like. Moreover, the one or more access terminals can fail to receive the page sent by base station 102 for the system update indicating that system information is to be changed in the next modification period. To account for the foregoing, system 100 enables the one or more access terminals entering base station 102 and/or attempting to camp on base station 102 to collect and retain system information sent by base station 102 prior to identification of modification period information (e.g., modification period boundary, modification period duration, ... ). Further, upon recognizing the modification period information, the retained system information can be selectively discarded or applied as described herein. In contrast, conventional approaches commonly forgo collection of system information prior to an access terminal identifying the modification period information, which can lead to delay in collecting consistent system information.

Figure 2:
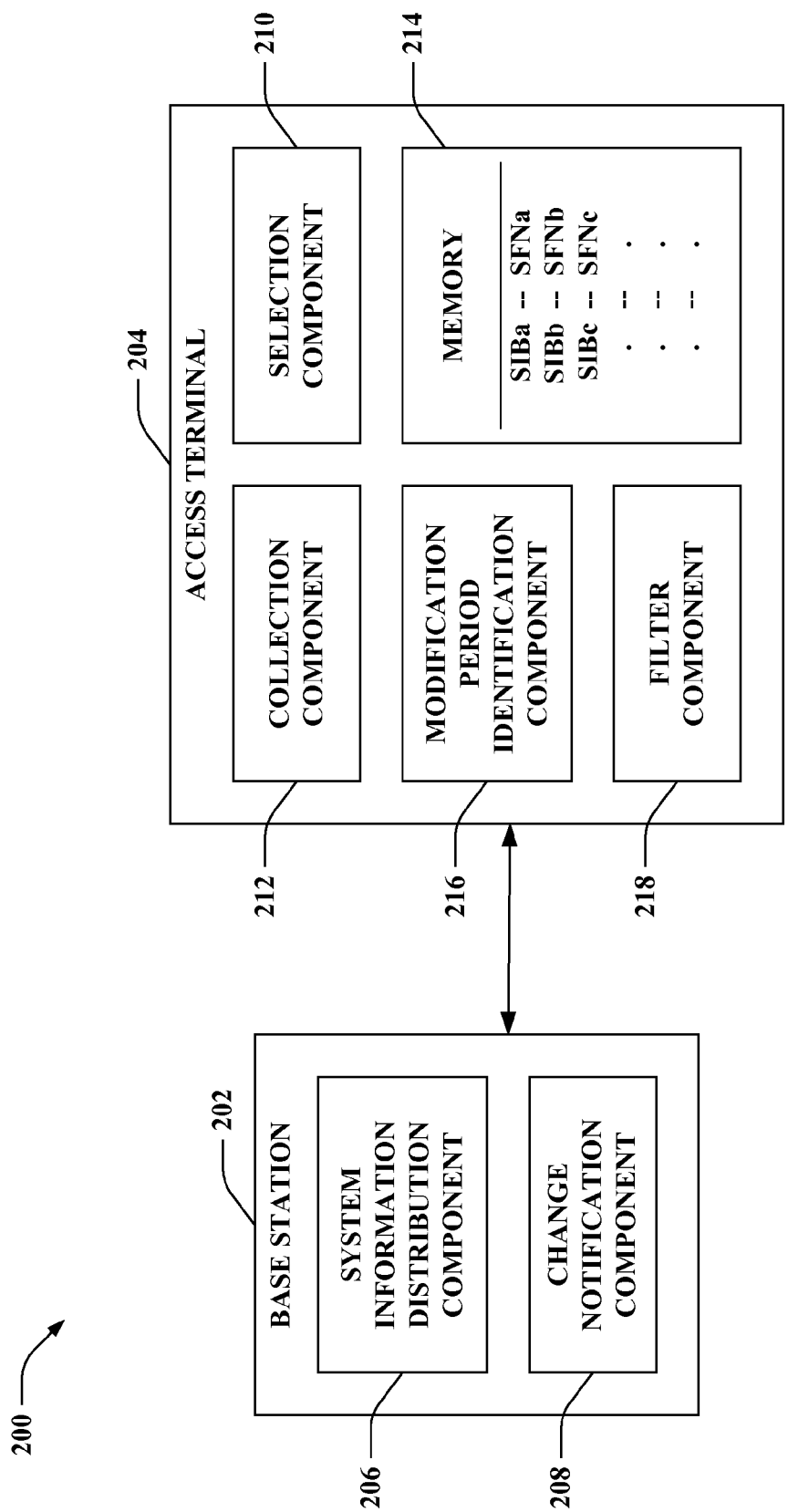
FIG. 2 is an illustration of an example system that supports collecting consistent system information in a wireless communication environment.

Now referring to FIG. 2, illustrated is a system 200 that supports collecting consistent system information in a wireless communication environment. System 200 includes a base station 202 that can transmit and/or receive information, signals, data, instructions, commands, bits, symbols, and the like. Base station 202 can communicate with an access terminal 204 via the forward link and/or reverse link. Access terminal 204 can transmit and/or receive information, signals, data, instructions, commands, bits, symbols, and the like. Moreover, although not shown, it is contemplated that any number of base stations similar to base station 202 can be included in system 200 and/or any number of access terminals similar to access terminal 204 can be included in system 200.

Access terminal 204 can collect consistent system information when camping on base station 202 during cell selection and/or cell re-selection. For instance, base station 202 can be associated with a cell (e.g., with a corresponding coverage area, ... ) such as a Long Term Evolution (LTE) cell; however, the claimed subject matter is not so limited.

Base station 202 can include a system information distribution component 206 and a change notification component 208. System information distribution component 206 can disseminate system information to access terminal(s) (e.g., access terminal 204, disparate access terminal(s) (not shown), ... ). Thus, system information distribution component 206 can provide information concerning configuration and capability of base station 202 to access terminal(s) in an LTE system. For example, system information distribution component 206 can broadcast system information via a Broadcast Control Channel (BCCH); yet, it is contemplated that the claimed subject matter is not so limited.

System information for base station 202 can be divided into multiple blocks called System Information Blocks (SIBs). SIBs other than System Information Block Type 1 (SIB1) can be carried in system information messages and mapping of SIBs to system information messages can be flexibly configurable as indicated by SIB1 (e.g., as specified by schedulingInfoList included in SIB1, ... ). Further, each SIB can be included in a single system information message, SIBs having the same scheduling requirement (e.g., periodicity, ... ) can be mapped to the same system information message, and System Information Block Type 2 (SIB2) can be mapped to the system information message that corresponds to the first entry in the list of system information messages in schedulingInfoList.

SIB1 can use a fixed schedule with a periodicity of 80 ms and repetitions made within 80 ms. Further, system information messages can be transmitted within periodically occurring time domain windows using dynamic scheduling. Each system information message can be associated with a corresponding time domain window, and time domain windows of different system information messages are non-overlapping. The length of the time domain window is common across system information messages and can be configurable. For instance, SIB1 can configure the length of the time domain window and the transmission periodicity for system information messages.

System information associated with base station 202 can be changed over time. For instance, change of system information can occur at specific radio frames using the concept of a modification period. Boundaries of the modification period can be defined by System Frame Number (SFN) values for which SFN mod modificationPeriod=0. A value for modificationPeriod, which is a duration of a modification period, is configured by system information (e.g., in SIB2, ... ). SFN can represent a radio frame; for instance, SFN can be a 10-bit rolling counter of a number of radio frames (e.g., 10 ms, ... ) that have elapsed. Moreover, within a modification period, system information can be transmitted a number of times with the same content as scheduled (e.g., by system information distribution component 206, ... ).

When access terminal 204 (or any disparate access terminal (not shown)) is camped on base station 202 and if the system information is going to change in a next modification period, then change notification component 208 can page access terminal 204 for a system update. When the network changes the system information or a portion thereof, change notification component 208 can notify access terminal 204 about the change (e.g., throughout a first modification period, . . . ). Then, in a next modification period (e.g., after the first modification period, . . . ), the network (e.g., via base station 202, system information distribution component 206, . . . ) can transmit the updated system information. Hence, upon receiving a change notification, access terminal 204 camped on base station 202 can acquire the new system information at the start of the next modification period. Moreover, access terminal 204 can apply the previously acquired system information until the new system information is acquired.

By way of another example, access terminal 204 (or any disparate access terminal (not shown)) can select or re-select to enter base station 202 (e.g., attempt to camp on base station 202, . . . ). Accordingly, access terminal 204 can be initially collecting system information, unaware of a location of a modification period boundary, and/or unaware whether system information is going to change in a next modification period. For instance, under the aforementioned scenario, access terminal 204 can be unable to receive a page indicating system update sent by change notification component 208. Yet, access terminal 204 can collect system information when entering base station 202 in an optimized manner as set forth herein.

Access terminal 204 can include a selection component 210 that can perform cell selection or cell re-selection to enter base station 202 (e.g., enter a cell associated with base station 202, . . . ). Further, selection component 210 can cause access terminal 204 to initiate an attempt to camp on base station 202. For instance, when access terminal 204 is powered-on, selection component 210 can scan for a suitable base station (e.g., base station 202, having a received signal to interference plus noise ratio (SINR) level measured to be above a threshold, . . . ) within vicinity. Upon recognizing the suitable base station, selection component 210 can select to enter such suitable base station. By way of another illustration, when camped on a base station (e.g., disparate base station, base station 202, . . . ), selection component 210 can search for a differing base station (e.g., base station 202, disparate base station, having a received SINR level measured to be stronger than the base station on which access terminal 204 is currently camped, . . . ) for re-selection. When identified, selection component 210 can cause access terminal 204 to enter the differing base station. It is contemplated that any selection or re-selection criteria can be utilized by selection component 210 and are intended to fall within the scope of the hereto appended claims.

Moreover, access terminal 204 can include a collection component 212 that can obtain system information disseminated by base station 202 (e.g., via system information distribution component 206, . . . ). Collection component 212, for instance, can receive system information upon access terminal 204 entering base station 202 (e.g., as effectuated by selection component 210, . . . ). Thus, collection component 212 can start SIB reading upon entering base station 202 as managed by selection component 210.

When access terminal 204 enters and/or tries to camp on base station 202 (e.g., by leveraging selection component 210, . . . ), access terminal 204 can be unaware of where a modification period boundary would be or if system information is going to change in a next modification period (e.g., since access terminal 204 can miss pages from change notification component 208, . . . ). Yet, collection component 212 can receive system information upon entering base station 202. Further, collection component 212 can store the received system information in memory 214.

Memory 214 can store data to be transmitted, received data, and any other suitable information related to performing the various actions and functions set forth herein. It will be appreciated that the data store (e.g., memory 214, . . . ) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 214 of the subject systems and methods is intended to comprise, without being limited to, these and any other suitable types of memory.

Collection component 212 can collect SIBs and store the SIBs with respective corresponding time stamps in memory 214. Thus, for each SIB, a corresponding SFN in which the SIB was received by access terminal 204 can be retained in memory 214 by collection component 212 with the SIB. By way of example, SIBa can be obtained at SFNa, SIBb can be obtained at SFNb, SIBc can be obtained at SFNc, and so forth. Following this example, collection component 212 can store SIBa and corresponding SFNa, SIBb and corresponding SFNb, SIBc and corresponding SFNc, and so forth in memory 214.

Moreover, collection component 212 can update an SIB retained in memory 214. Thus, if an SIB already present in memory 214 is obtained again (e.g., prior to identifying modification period information, . . . ), collection component 212 can replace the SIB and corresponding SFN in memory 214 (e.g., update the SIB and corresponding SFN in memory 214, . . . ). By way of illustration, if SIBa and SFNa is included in memory 214 and SIBa' is later acquired (e.g., at SFNa', . . . ), collection component 212 can replace SIBa and corresponding SFNa with the later received SIBa' and associated SFNa' in which SIBa' is later received.

According to a further example, upon starting SIB reading, collection component 212 can collect a given SIB every time it is transmitted (e.g., sent by system information distribution component 206 of base station 202, . . . ) prior to identifying modification period information. By way of yet another example, collection component 212 can start SIB reading before modification period information is detected with an assumption that a modification period has a minimum possible duration. Following this example, if collection component 212 acquires an SIB at SFN x, where $64*I \leq x < 64*(I+1)$ such that x is an integer and I is a positive integer corresponding to an index for a given modification period, then the SIB does not need to be acquired again before SFN $64*(I+1)$ even if a modification period boundary is not known and/or paging is not active. Hence, access terminal 204 can have the current SIB since the SIB can remain unchanged during such time.

Further, access terminal 204 can include a modification period identification component 216 that can detect modification period information. According to an illustration, the modification period information can include a modification period boundary, a modification period duration, and the like. The modification period boundary can be defined by an SFN value for which SFN mod modificationPeriod=0, where a value for modificationPeriod is the modification period duration. By way of example, modification period identification component 216 can identify that an SIB received by collection component 212 is an SIB2. Following this example, upon identifying the SIB2, modification period identification component 216 can extract modification period information from the SIB2. For instance, a value of modificationPeriod carried in SIB2 can be recognized by modification period identification component 216; however, the claimed subject matter is not so limited.

Moreover, access terminal 204 can include a filter component 218 that can selectively identify SIBs to apply and/or discard. For instance, filter component 218 can utilize and/or remove SIBs retained in memory 214. According to an example, upon recognizing the modification period information (e.g., with modification period identification component 216, ...), filter component 218 can discard SIB(s) maintained in memory 214 belonging to a previous modification period. Filter component 218 can apply the modification period information extracted by modification period identification component 216 (e.g., from SIB2, ...) to SIB(s) previously received and retained in memory 214 by collection component 212 such that SIB(s) with corresponding SFN(s) signifying reception prior to a current modification period can be discarded. Moreover, filter component 218 can employ SIB(s) with corresponding SFN(s) that indicate reception during the current modification period, thereby mitigating repetition of collection of such SIB(s) by access terminal 204.

Following is an example that can further illustrate operation of system 200. Selection component 210 can cause access terminal 204 to select or re-select to enter base station 202. Accordingly, collection component 212 can begin to receive system information sent by base station 202 (e.g., by system information distribution component 206, ...). For instance, collection component 212 can obtain and store SIB(s) along with corresponding SFN(s) in memory 214 prior to identifying modification period information. By way of illustration, System Information Block Type 3 (SIB3) can be received at SFN P, and collection component 212 can store SIB3 with SFN P in memory 214. Moreover, System Information Block Type 4 (SIB4) can be received at SFN Q, and collection component 212 can store SIB4 with SFN Q in memory 214. SIB3 (e.g., already present in memory 214, ...) can again be received at SFN R, and accordingly, collection component 212 can replace the version of SIB3 previous retained in memory 214 and SFN P with the later received version of SIB3 and SFN R; however, the claimed subject matter is not limited to this example. Further, System Information Block Type 5 (SIB5) can be received at SFN S, and collection component 212 can store SIB5 with SFN S in memory 214. Moreover, SIB2 can be received at SFN T, and collection component 212 can store SIB2 with SFN T in memory 214. Modification period identification component 216 can further extract modification period information from SIB2. For example, SFN S and SFN T can be recognized as being within a current modification period, while SFN P, SFN Q, and SFN R can be identified as not being within the current modification period. Based thereupon, filter component 218 can discard SIB3 (e.g., associated with SFN R, ...) and SIB4 (e.g., associated with SFN Q, ...) from memory 214, while retaining SIB2 (e.g., associated with SFN T, ...) and SIB5 (e.g., associated with SFN S, ...). Thus, SIB2 and SIB 5 need not be collected again during the current modification period. It is to be appreciated, however, that the claimed subject matter is not limited to the aforementioned example.

Figure 3:
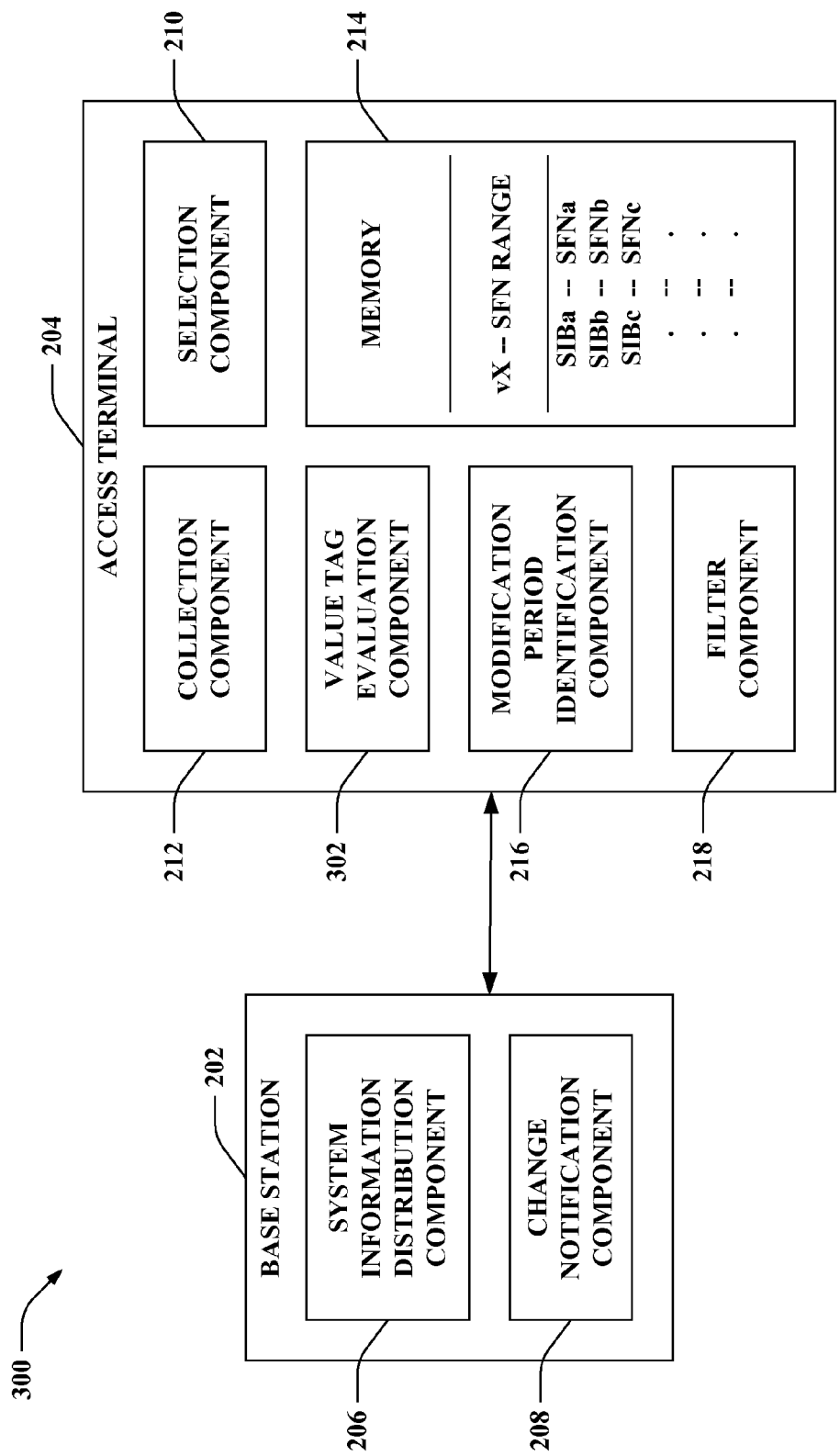
FIG. 3 is an illustration of an example system that collects system information during cell selection or cell re-selection in a wireless communication environment.

Now referring to FIG. 3, illustrated is a system 300 that collects system information during cell selection or cell reselection in a wireless communication environment. System 300 includes base station 202 and access terminal 204. As described herein, base station 202 can further include system information distribution component 206, which can disseminate system information, and change notification component 208, which can provide a page signifying a system update. Moreover, access terminal 204 can include selection component 210, collection component 212, memory 214, modification period identification component 216, and filter component 218.

While the above example related to system 200 can involve discarding SIBs received in a previous modification period, at least a subset of such SIBs can be usable in a current modification period. By way of another example, access terminal 204 can combine SIBs from across modification period boundaries provided system information has not changed between modification periods. Thus, filter component 218 can discard SIBs from previous modification period(s) that have changed across a modification period boundary. Further, filter component 218 can retain and apply SIBs from previous modification period(s) that have not changed across a modification period boundary.

Access terminal 204 can further include a value tag evaluation component 302 that can analyze a value tag associated with a received SIB1. When an SIB1 is received, collection component 212 can replace an old SIB1 in memory 214 with the newly received SIB1. Further, value tag evaluation component 302 can detect a value tag included in the received SIB1. Value tag evaluation component 302 can compare the detected value tag to a stored value tag (e.g., vX, associated with a previously received SIB1, ...) retained in memory 214.

Further, value tag evaluation component 302 can maintain a range of SFNs across which a value tag has not changed, and can retain the range of SFNs (e.g., SFN range, ...) for the value tag (e.g., vX, ...) in memory 214. Thus, if value tag evaluation component 302 identifies that the detected value tag from the received SIB1 matches the stored value tag retained in memory 214, then an SFN range can be updated to include an SFN at which the SIB1 is received. Alternatively, if value tag evaluation component 302 recognizes that the detected value tag from the received SIB1 does not match the stored value tag retained in memory 214, then the detected value tag can be retained in memory 214 (e.g., replacing the stored value tag, retained along with the stored value tag such that more than one value tag each with a respective SFN range can be stored, ...) along with an SFN range (e.g., the SFN at which the SIB1 is received, ...).

Value tag evaluation component 302 can maintain a range of SFNs for SIB1 across which the value tag remains consistent. A consistent value tag can indicate unchanged SIBs. Further, when an SIB is altered, a value tag in SIB1 is changed. A value tag included in SIB1 indicates whether an SIB has changed. Accordingly, value tag evaluation component 302 can check a value tag and note an SFN for each received SIB1.

The following example sequence can describe operation of access terminal 204 when evaluating value tags. When SIB1 is received by access terminal 204, collection component 212 can replace an old SIB1 stored in memory 214 with a newly received SIB1. Moreover, a range of SFNs across which the value tag has not changed can be maintained in memory 214 by value tag evaluation component 302. Below is an example illustration of a sequence of SIB1s that can be analyzed by value tag evaluation component 302; yet, it is to be appreciated that the claimed subject matter is not so limited. An SIB1 can be received at SFN A with value tag v1, and the SFN range for value tag v1 stored in memory 214 can be A-A. Thereafter, an SIB1 can be received at SFN B with value tag v1, and the SFN range for value tag v1 stored in memory 214 can be A-B. Further, an SIB1 can be received at SFN C with value tag v1, and the SFN range for value tag v1 stored in memory 214 can be A-C. Thereafter, an SIB1 can be received at SFN D with value tag v2, and the SFN range for value tag v2 stored in memory 214 can be D-D. Moreover, this example sequence can be continued.

When SIB2 is received, a modification period boundary can be determined by modification period identification component 216. Moreover, filter component 218 can look for SIB1 in the same modification period. If such an SIB1 already exists or when it is received, filter component 218 can look at the value tag of this SIB1. Then, based on the above SFN range across which a value tag has not changed, filter component 218 can determine if the SIBs belonging to an old modification period are usable or not. If the value tag of SIB1 received in the previous modification period is the same as the value tag of SIB1 in a current modification period, then filter component 218 can keep the SIBs received in the old modification period. Alternatively, if the value tag of SIB1 received in the previous modification period is not the same as the value tag of SIB1 received in the current modification period, then filter component 218 can discard the SIBs from the previous modification period.

Selectively applying and/or discarding SIBs based upon an SFN and a value tag can be particularly useful in bad radio conditions. If SIB2 (e.g., system information including SIB2, . . . ) is not decoded or missed a couple of times, the other SIBs collected during that time can be saved and filtered retroactively based on which SIBs are current.

Figure 4:
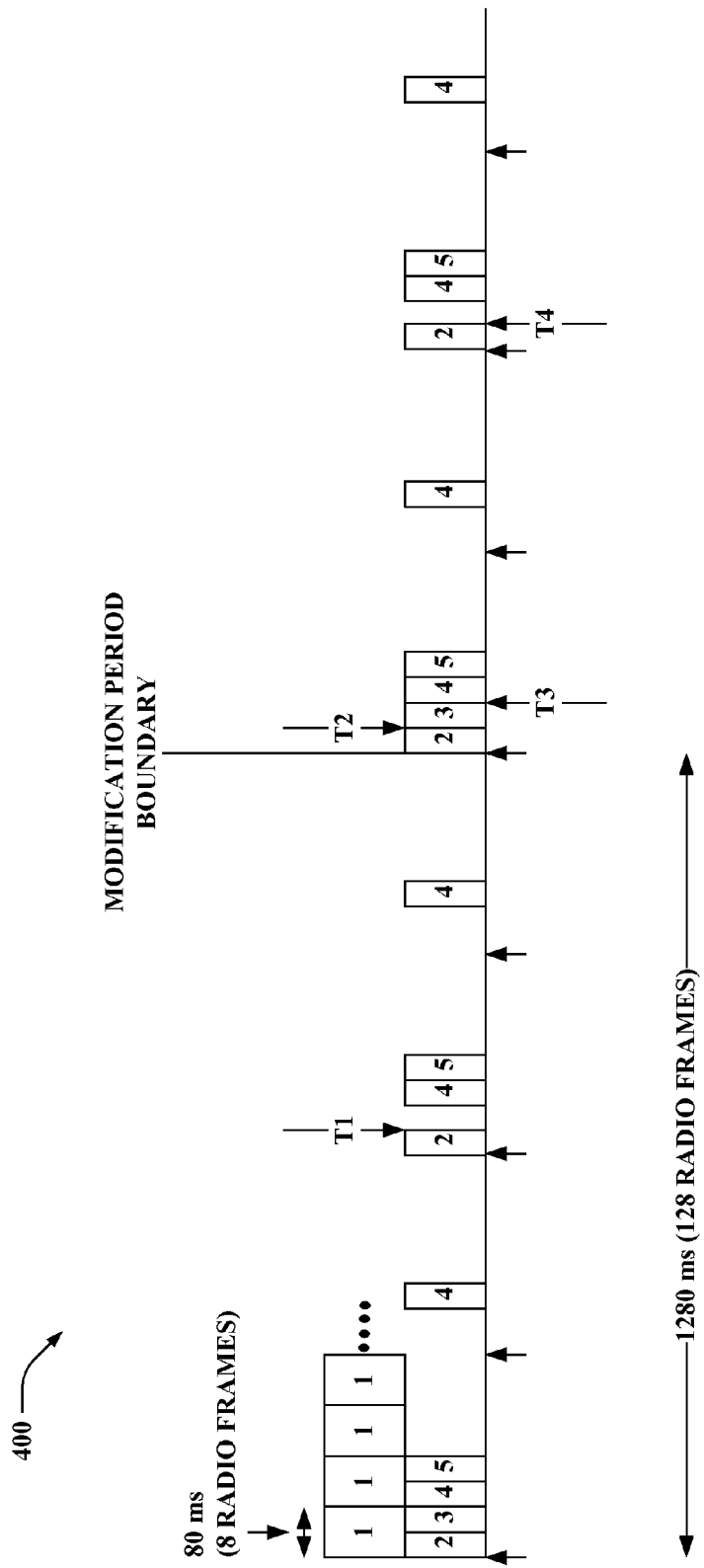
FIG. 4 is an illustration of an example timeline depicting a plurality of modification periods separated by a modification period boundary.

Turning to FIG. 4, illustrated is an example timeline 400 depicting a plurality of modification periods separated by a modification period boundary. Timeline 400 corresponds to employment of filtering of SIBs based upon SFN and value tag. More particularly, value tags included in SIB1s received before the modification period boundary can match value tags included in SIB1s received after the modification period boundary, thus indicating that SIBs have remained unchanged over the modification period boundary. It is contemplated, however, that the claimed subject matter is not so limited.

For instance, in FIG. 4, assuming that an access terminal has received SIB1 before it starts collecting the remaining system information, if reading of system information is started at time T1, then all system information can be obtained by time T3. If for some reason (e.g., bad radio conditions, Abstract Syntax Notation One (ASN.1) decoding failure, or any other reason, . . . ) the SIB2 right after the modification period boundary is missed, all system information can be obtained by time T4 (which would be the same if reading is started at time T2). The advantage is that if buffering is not employed, then a delay until the next occurrence of SIB3, which would be about 640 ms after time T4, could result.

Figure 5:
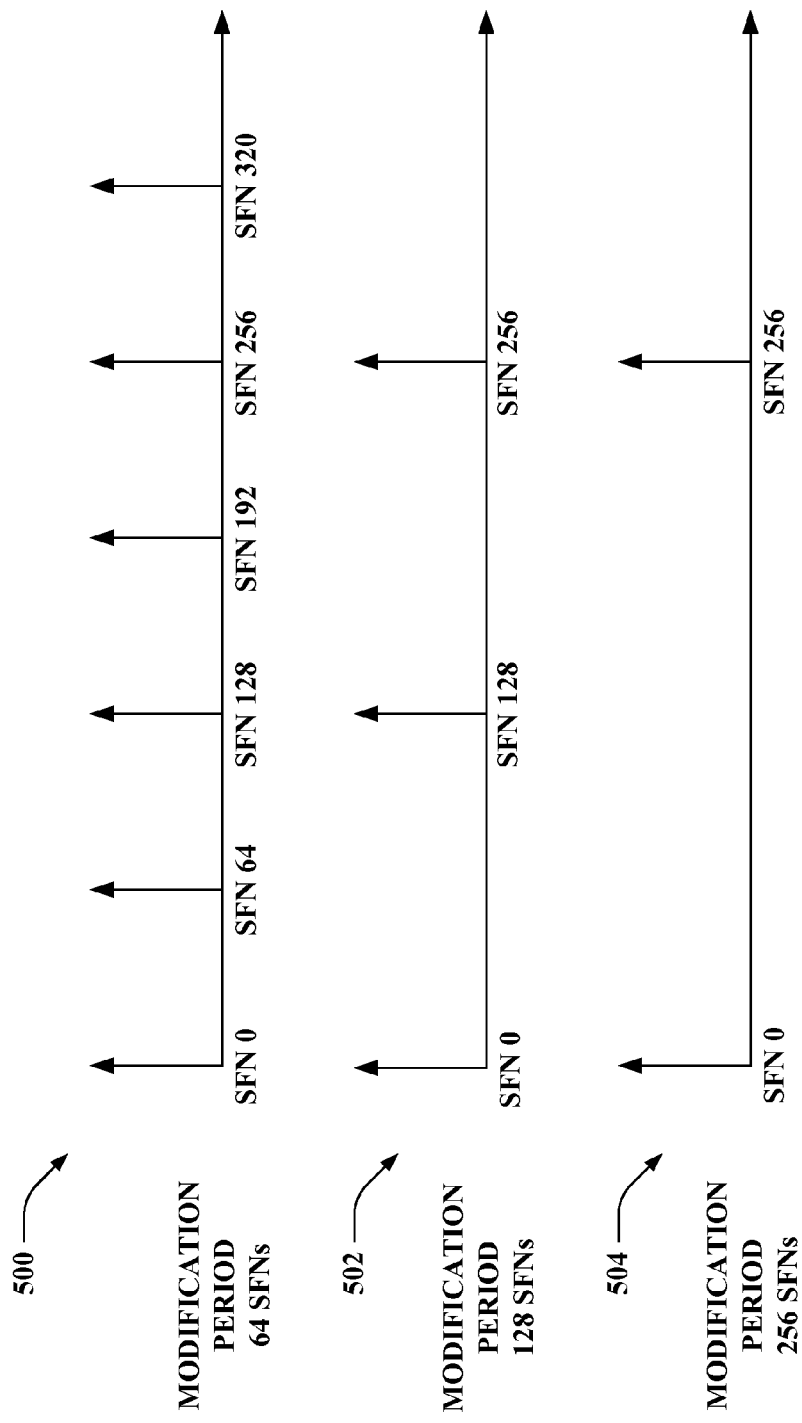
FIG. 5 is an illustration of example timelines depicting possible modification period boundaries.

Referring to FIG. 5, illustrated are example timelines depicting possible modification period boundaries. For instance, timeline 500 corresponds to modification periods that include 64 SFNs, timeline 502 corresponds to modification periods that include 128 SFNs, and timeline 504 corresponds to modification periods that include 256 SFNs.

When an access terminal (e.g., access terminal 204 of FIG. 2, . . . ) starts reading SIBs, it is unaware of when SIBs can change since a modification period boundary can be unknown until SIB2 is received. As a result, to have the current SIBs in this window—from starting SIB reading to receiving SIB2—the access terminal typically can collect a given SIB every time it is transmitted. According to another example proposed herein, collection of an SIB every time it is transmitted in this window can be avoided as set forth below.

Following this example, SIB reading can be started with an assumption that a modification period has a minimum possible duration (e.g., prior to extracting modification period information from a received SIB, . . . ). The access terminal can safely do so since possible durations are multiples of the minimum duration, and SFN 0 is a modification period boundary.

According to an illustration, a minimum modification period duration can be 640 ms (64 SFNs). If an SIB is acquired at SFN x, where $64*I \leq x < 64*(I+1)$ such that x is an integer and I is a positive integer corresponding to an index for a given modification period, then the SIB does not need to be acquired again before SFN $64*(I+1)$ even if a modification period boundary is not known and/or paging is not active. Hence, the access terminal can still have a current SIB until this SFN as the SIB cannot change before such SFN. Moreover, as depicted in FIG. 5, a modification period boundary does not exist between $64*I$ and $64*(I+1)$ regardless whether the modification period includes 64 SFNs, 128 SFNs, or 256 SFNs.

Figure 6:
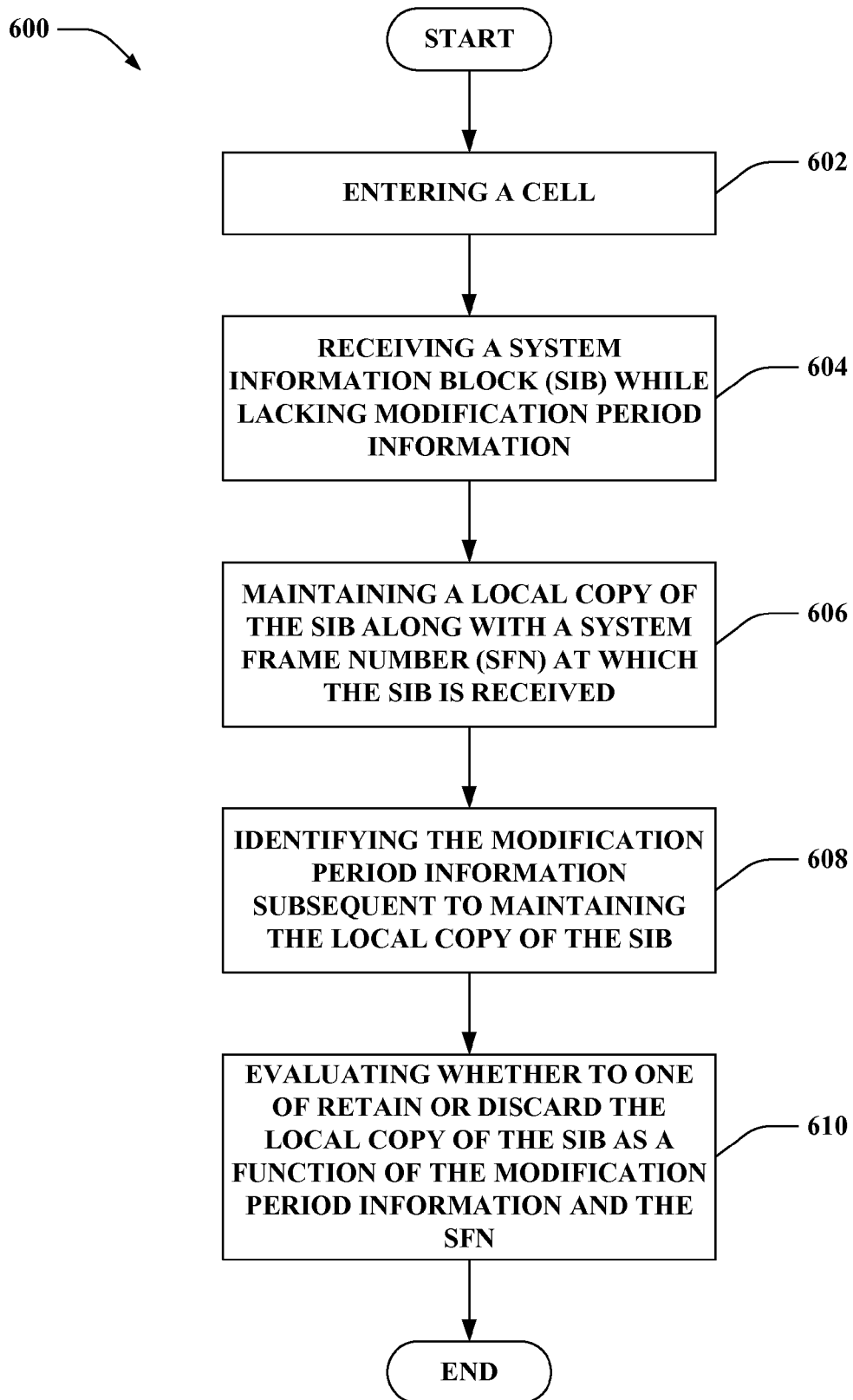
FIG. 6 is an illustration of an example methodology that facilitates collecting system information in a wireless communication environment.
Figure 7:
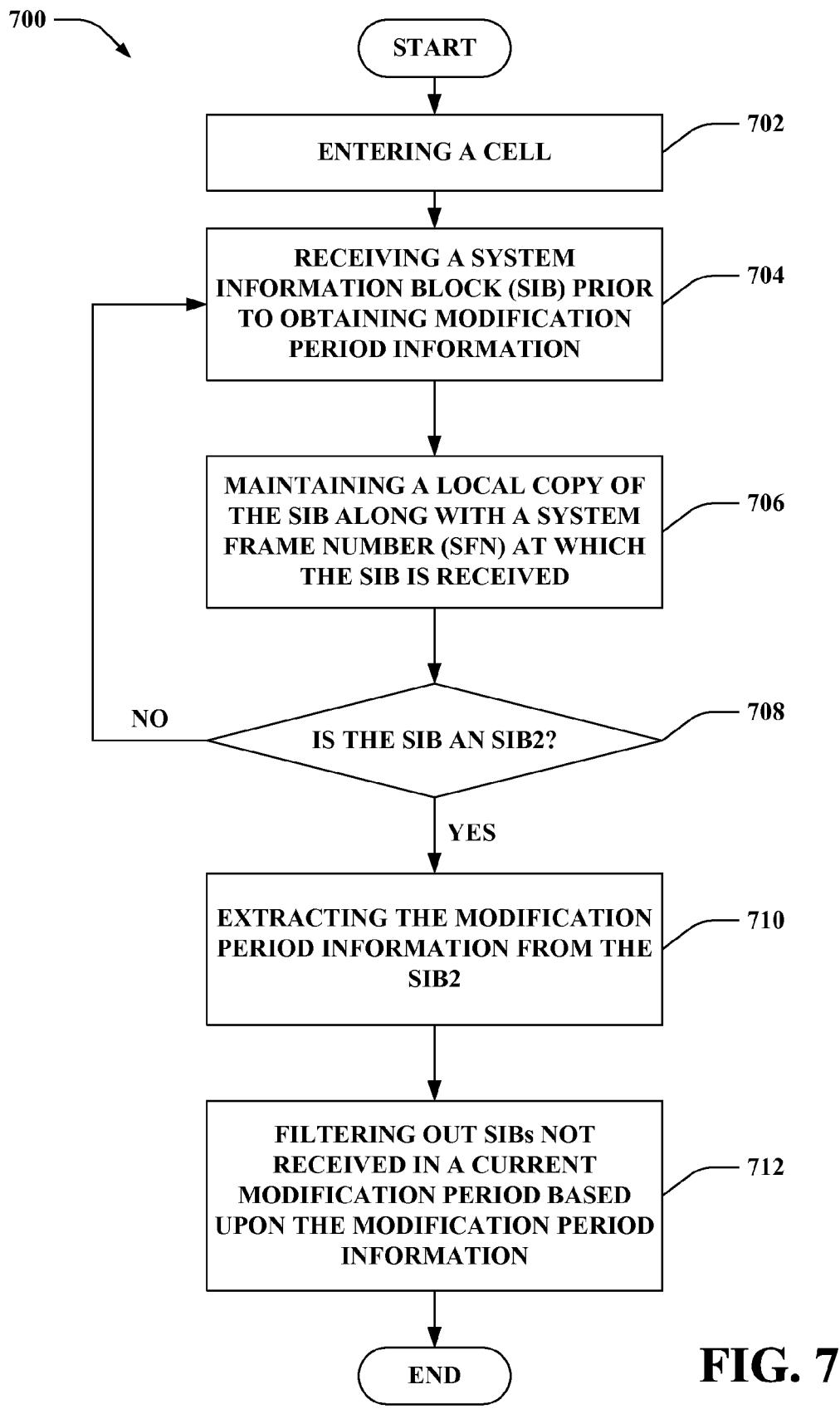
FIG. 7 is an illustration of an example methodology that facilitates discarding system information belonging to a previous modification period when a modification period is identified in a wireless communication environment.
Figure 8:
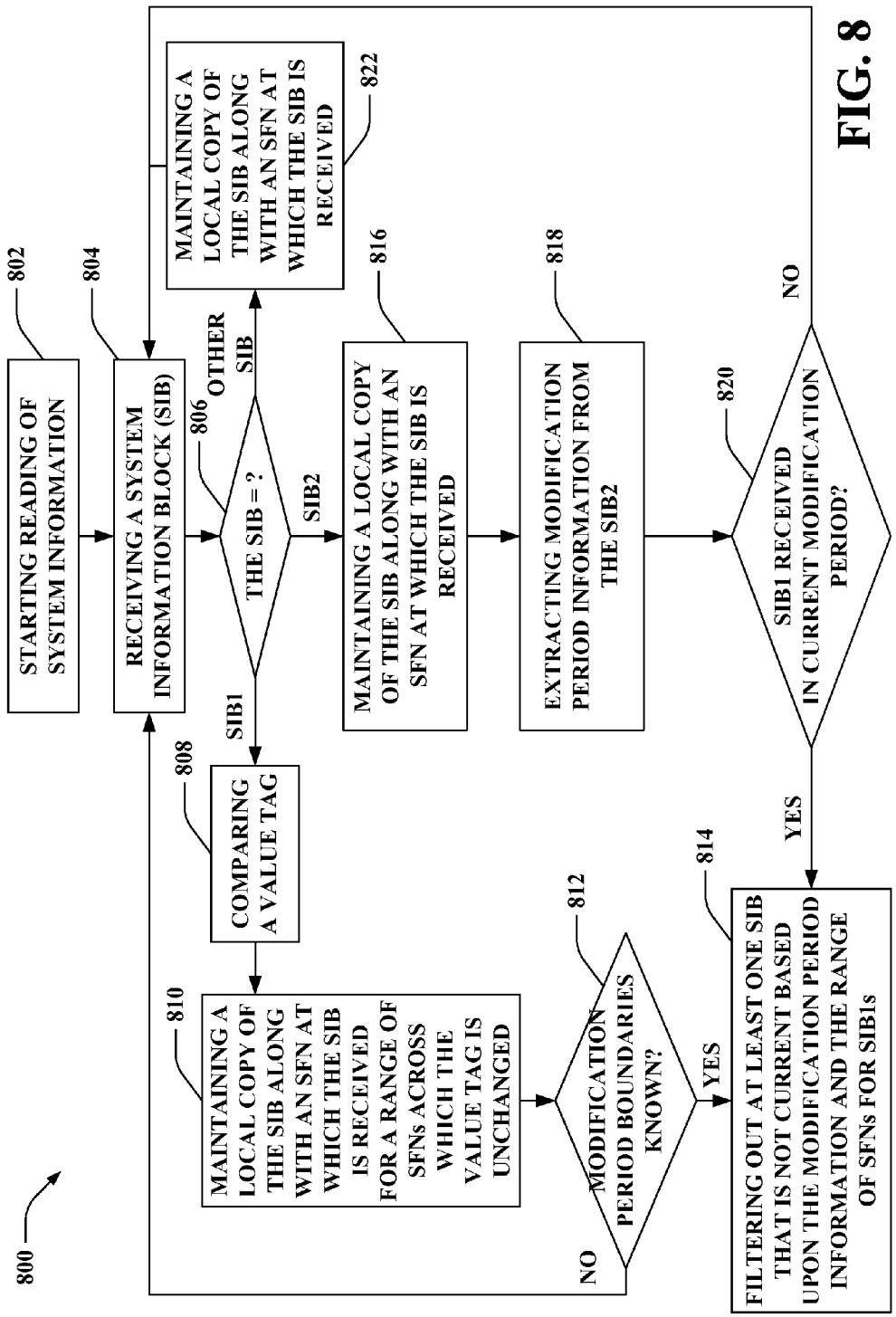
FIG. 8 is an illustration of an example methodology that selectively removes system information in a wireless communication environment.

Referring to FIGS. 6-8, methodologies relating to yielding a consistent set of system information in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates collecting system information in a wireless communication environment. At 602, a cell can be entered. For instance, the cell can be entered during cell selection or cell re-selection (e.g., upon selecting and/or re-selecting a base station, . . . ). Moreover, the cell can be entered to attempt to camp thereupon.

At 604, a System Information Block (SIB) can be received while lacking modification period information. The modification period information can relate to a modification period boundary, a modification period duration, and the like. Moreover, the SIB can be received without knowing whether system information is to be changed in a next modification period. Further, the SIB can be received during a particular radio frame represented by a given System Frame Number (SFN). Moreover, it is contemplated that any number of disparate SIBs can also be received. According to an illustration, SIBs can be received until a System Information Block Type 2 (SIB2) is obtained (e.g., the SIB can be received more than once prior to receipt of the SIB2, . . . ). By way of another example, upon receiving the SIB, that SIB need not be acquired again within a period of time corresponding to a minimum modification period duration (e.g., receipt of the SIB can be inhibited during a period of time corresponding to a minimum modification period duration upon receiving the SIB, . . . ). Following this example, the minimum modification period duration can be assumed when entering the cell and utilized prior to obtaining the modification period information. Thus, subsequent reception of the SIB can be inhibited within a minimum modification period employed as a default prior to identifying the modification period information.

At 606, a local copy of the SIB along with a System Frame Number (SFN) at which the SIB is received can be maintained. For instance, the local copy of the SIB and the SFN can be stored in memory. According to an example, if the SIB, which is stored in memory along with the SFN, is received again (e.g., System Information Block Type 3 (SIB3) is received, stored in memory and later received again, . . . ) while lacking modification period information (e.g., prior to receipt of an SIB2, . . . ), then the local copy of the SIB and the SFN can be updated (e.g., a later received version of the SIB and corresponding SFN can replace an earlier received version of the SIB and corresponding SFN, . . . ). Thus, the SIB can be received subsequent to maintaining the local copy of the SIB at a later SFN, and the SIB maintained in the local copy and the SFN can be replaced with the SIB received at the later SFN and the later SFN.

At 608, the modification period information can be identified subsequent to maintaining the local copy of the SIB. For instance, an SIB2 can be received, and the modification period information can be extracted from the received SIB2. Moreover, the modification period information can relate to a modification period boundary, a modification period duration, and the like.

At 610, an evaluation whether to one of retain or discard the local copy of the SIB can be effectuated as a function of the modification period information and the SFN. According to an example, the local copy of the SIB can be discarded when deemed to belong to a previous modification period. By way of another example, the evaluation whether to retain or discard the local copy of the SIB can be effectuated as a function of the modification period information, the SFN, and a value tag. Following this example, an SFN range across which the value tag is unchanged can be maintained (e.g., stored in memory, . . . ), and the local copy of the SIB can be selectively retained or discarded based thereupon. Moreover, the SIB can be utilized if not discarded. According to an illustration, the local copy of the SIB from a previous modification period (e.g., detected based upon the SFN, . . . ) can be retained upon identifying the modification period information when the SIB is unchanged between the previous modification period and a current modification period as recognized by the value tag being unchanged from the previous modification period to the current modification period. By way of another illustration, the local copy of the SIB from a previous modification period (e.g., detected based upon the SFN, . . . ) can be discarded upon identifying the modification period information when the SIB is changed between the previous modification period and a current modification period as recognized by the value tag changing from the previous modification period to the current modification period.

Now turning to FIG. 7, illustrated is a methodology 700 that facilitates discarding system information belonging to a previous modification period when a modification period is identified in a wireless communication environment. At 702, a cell can be entered (e.g., based upon cell selection or cell re-selection, . . . ). At 704, a System Information Block (SIB) can be received prior to obtaining modification period information. For instance, the SIB can be received before modification period information is extracted from a received System Information Block Type 2 (SIB2). At 706, a local copy of the SIB along with a System Frame Number (SFN) at which the SIB is received can be maintained (e.g., the SIB can be collected and stored with a corresponding time stamp in memory, . . . ). Thus, for each SIB, a corresponding SFN in which the associated SIB is received can be maintained.

Moreover, SFN can represent a radio frame on which the associated SIB was received. SFN can be a 10-bit rolling counter of a number of radio frames (e.g., 10 ms, . . . ) that have elapsed. Moreover, when an SIB is received and it is already present (e.g., in memory, . . . ), such SIB and the corresponding SFN can be replaced. At 708, a determination can be effectuated concerning whether the SIB is a SIB2. If the SIB is determined to not be an SIB2 at 708, then methodology 700 returns to 704. Further, if the SIB is determined to be an SIB2 at 708, then methodology 700 continues to 710. At 710, the modification period information can be extracted from the SIB2. At 712, SIBs not received in a current modification period can be filtered out based upon the modification period information. Accordingly, when the SIB2 is received, a modification period window recognized from the SIB2 can be applied to SIBs already received. The term applying can mean getting rid of the SIBs whose SFNs indicate that they were not received in a current modification period. Thus, system information received in the current modification period can be maintained and need not be collected again.

Referring now to FIG. 8, illustrated is a methodology 800 that selectively removes system information in a wireless communication environment. At 802, reading of system information can be started. For instance, reading of system information can begin upon entering a cell (e.g., entering a base station, . . . ). At 804, a System Information Block (SIB) can be received. The SIB can be received before modification period information is obtained. At 806, the type of the SIB can be determined. If the SIB is determined to be a System Information Block Type 1 (SIB1) at 806, then methodology 800 can continue to 808. At 808, a value tag included in the SIB1 can be compared to a stored value tag (e.g., retained in memory, . . . ). At 810, a local copy of the SIB along with a System Frame Number (SFN) at which the SIB is received can be maintained for a range of SFNs across which the value tag is unchanged. At 812, a determination can be effectuated concerning whether modification period boundaries are known. If the modification period boundaries are determined to be unknown at 812, then methodology 800 can return to 804. If the modification period boundaries are determined to be known at 812, then methodology 800 can continue to 814. At 814, at least one SIB that is not current can be filtered out based upon modification period information and the range of SFNs for SIB1s.

If the SIB is determined to be a System Information Block Type 2 (SIB2) at 806, then methodology 800 can continue to 816. At 816, a local copy of the SIB along with an SFN at which the SIB is received can be maintained. At 818, modification period information can be extracted from the SIB2. At 820, a determination can be effectuated pertaining to whether SIB1 is received in a current modification period. If an SIB1 is determined to be received in the current modification period at 820, then methodology 800 can continue to 814 and at least one SIB that is not current can be filtered out based upon the modification period information and the range of SFNs for SIB1s. If an SIB1 is determined to not be received in the current modification period at 820, then methodology 800 can return to 804.

If the SIB is determined to be an SIB other than SIB1 or SIB2 at 806, then methodology 800 can continue to 822. At 822, a local copy of the SIB along with an SFN at which the SIB is received can be maintained. Thereafter, methodology 800 can return to 804.

Methodology 700 of FIG. 7 can assume by default that SIBs received in a previous modification period are unusable. However, SIBs received in a previous modification period can be usable. Oftentimes, an access terminal can be able to combine SIBs from across modification period boundaries provided the SIB information has not changed between these modification periods. Thus, in methodology 800 of FIG. 8, the SIBs from the old window can be kept unless they have changed. Accordingly, methodology 800 can enable recognizing if system information messages have changed across a modification period boundary encountered during SIB reading, and can be useful in a case where SIB2 is not received in the modification period in which SIB reading is started.

The following sequence can describe the algorithm associated with methodology 800. When an SIB1 is received, the newly received SIB1 can replace a previously received SIB1. However, a range of SFNs across which the value tag has not changed can be maintained. For instance, if SIB1 is received at following SFNs:

SFN A with value tag v1, the range would be A-A;
SFN B with value tag v1, the range would be A-B;
SFN C with value tag v1, the range would be A-C;
SFN D with value tag v2, the range would be D-D, and so on.

When SIB2 is received, a modification period boundary is determined and an access terminal can look for SIB1 in the same modification period. If such an SIB1 already exists or when it is received, the access terminal can look at the value tag of this SIB1. Then, based on the above SFN range across which a value tag has not changed, the access terminal can determine if the SIBs belonging to the old modification period are usable or not. If the value tag of SIB1 received in the previous modification period is the same as the value tag of SIB1 in a current modification period, then the access terminal can keep the SIBs received in the old modification period. Alternatively, if the value tag of SIB1 received in the previous modification period is not the same as the value tag of SIB1 received in the current modification period, then the access terminal can discard the SIBs from the previous modification period.

For instance, methodology 800 can be particularly useful in bad radio conditions. If SIB2 (e.g., system information including SIB2, . . . ) is not decoded or missed a couple of times, the other SIBs collected during that time can be saved and filtered retroactively based on which ones are current.

It will be appreciated that, in accordance with one or more aspects described herein, inferences can be made pertaining to yielding a consistent set of system information in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
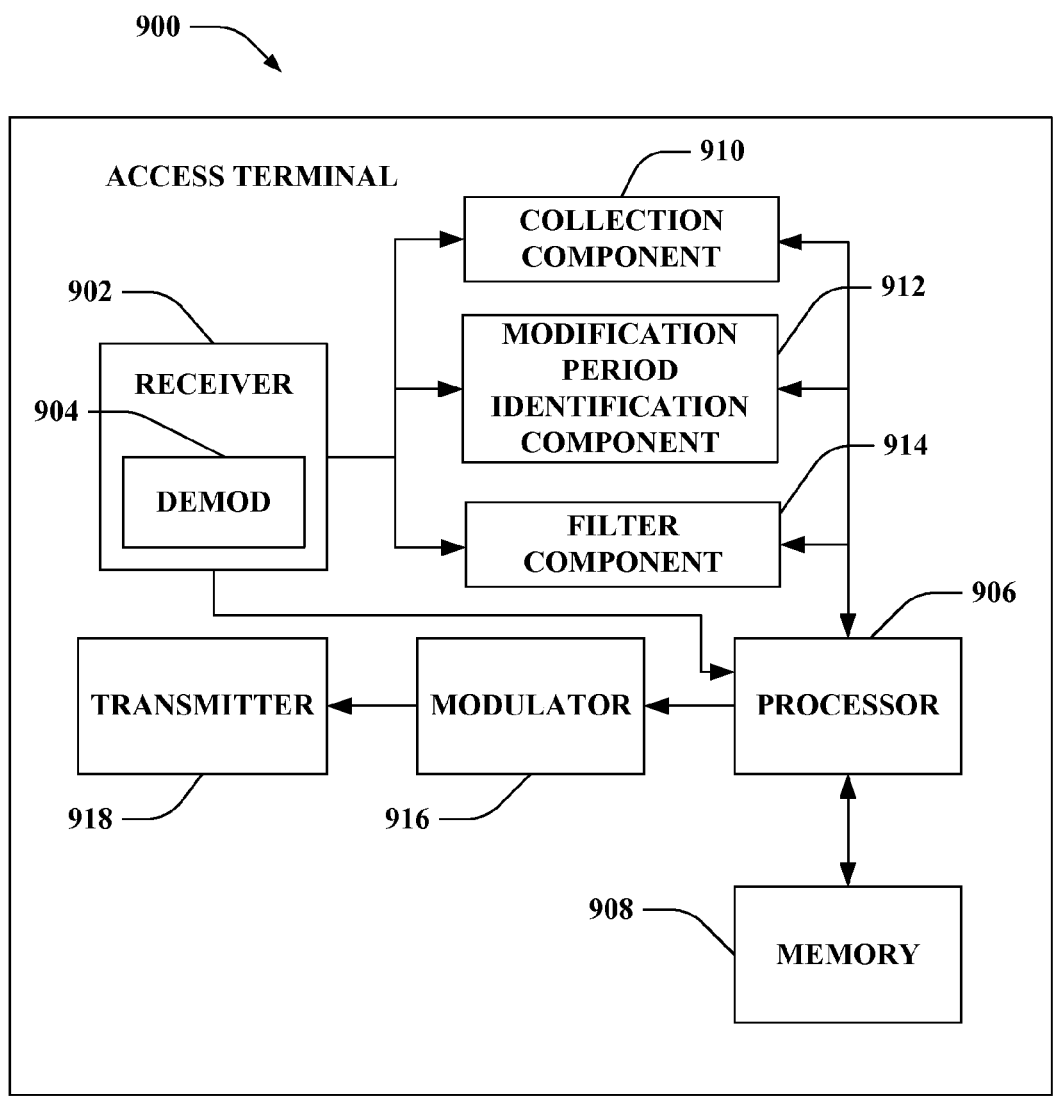
FIG. 9 is an illustration of an example access terminal that collects system information in a wireless communication system.

FIG. 9 is an illustration of an access terminal 900 that collects system information in a wireless communication system. Access terminal 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 918, a processor that controls one or more components of access terminal 900, and/or a processor that both analyzes information received by receiver 902, generates information for transmission by transmitter 918, and controls one or more components of access terminal 900.

Access terminal 900 can additionally comprise memory 908 that is operatively coupled to processor 906 and that can store data to be transmitted, received data, and any other suitable information related to performing the various actions and functions set forth herein. Memory 908, for instance, can store protocols and/or algorithms associated with collecting system information, extracting modification period information, filtering system information retained in memory 908, and the like. Moreover, memory 908 can maintain system information, SFN ranges, and so forth.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 can be operatively coupled to a collection component 910, a modification period identification component 912, and/or a filter component 914. Collection component 910 can be substantially similar to collection component 212 of FIG. 2, modification period identification component 912 can be substantially similar to modification period identification component 216 of FIG. 2, and/or filter component 914 can be substantially similar to filter component 218 of FIG. 2. Collection component 910 can acquire and store SIBs and corresponding SFNs during which the SIBs are respectively received in memory 908. Further, modification period identification component 912 can recognize a received SIB2 and extract modification period information therefrom. Moreover, filter component 914 can selectively remove or retain SIBs from memory 908 based upon the modification period information and the SFNs, for example. According to another example, filter component 914 can further selectively remove or retain SIBs from memory 908 based upon a range of SFNs over which a value tag remains consistent. Although not shown, it is further contemplated that access terminal 900 can include a selection component (e.g., substantially similar to selection component 210 of FIG. 2, . . . ) and/or a value tag evaluation component (e.g., substantially similar to value tag evaluation component 302 of FIG. 3, . . . ). Access terminal 900 still further comprises a modulator 916 and a transmitter 918 that transmits data, signals, etc. to a base station. Although depicted as being separate from the processor 906, it is to be appreciated that collection component 910, modification period identification component 912, filter component 914 and/or modulator 916 can be part of processor 906 or a number of processors (not shown).

Figure 10:
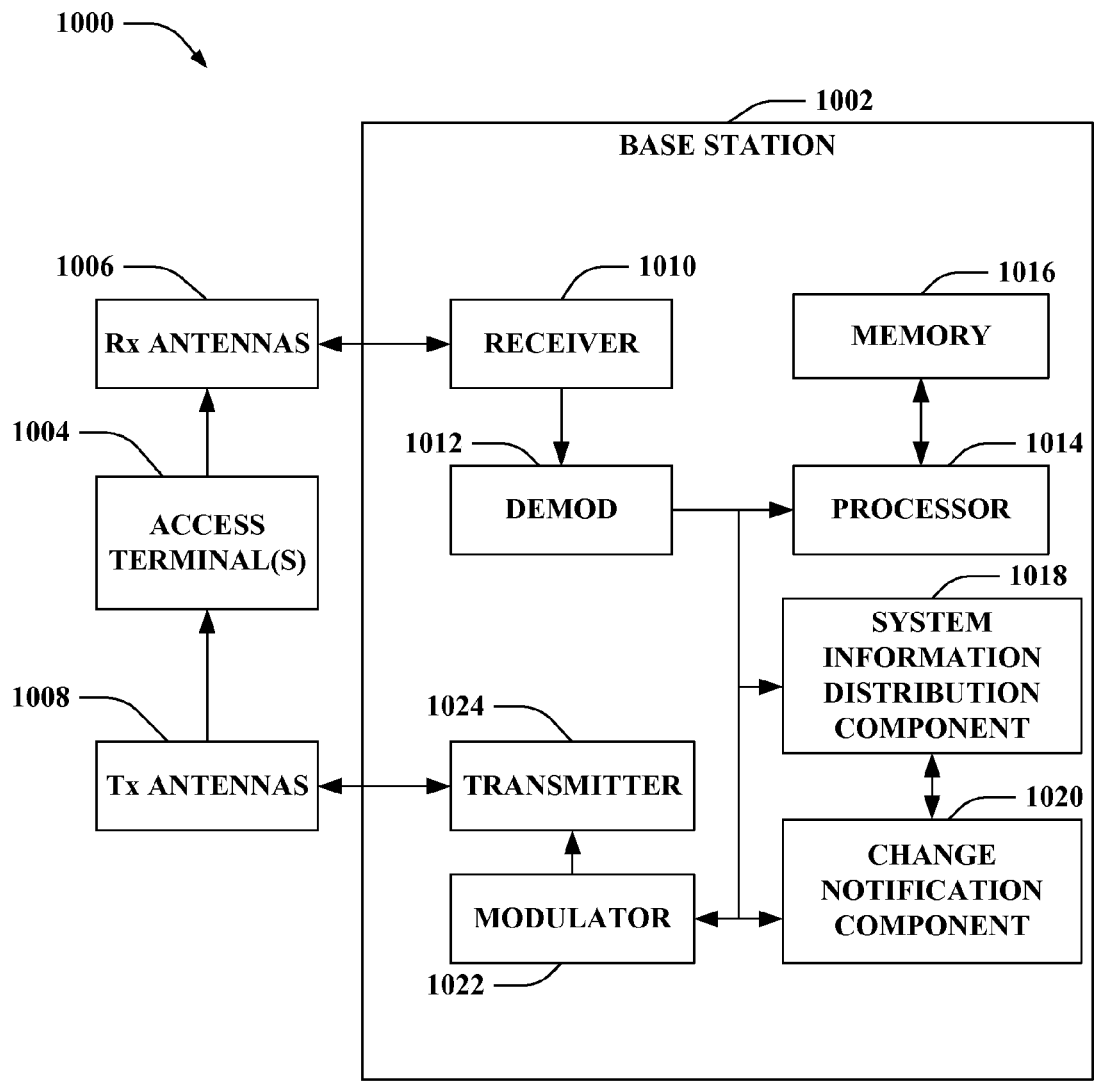
FIG. 10 is an illustration of an example system that distributes system information in a wireless communication environment.

FIG. 10 is an illustration of a system 1000 that distributes system information in a wireless communication environment. System 1000 comprises a base station 1002 (e.g., access point, . . . ) with a receiver 1010 that receives signal(s) from one or more access terminals 1004 through a plurality of receive antennas 1006, and a transmitter 1024 that transmits to the one or more access terminals 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores data to be transmitted to or received from access terminal(s) 1004 and/or any other suitable information related to performing the various actions and functions set forth herein. Processor 1014 is further coupled to a system information distribution component 1018 and/or a change notification component 1020. System information distribution component 1018 can be substantially similar to system information distribution component 206 of FIG. 2 and/or change notification component 1020 can be substantially similar to change notification component 208 of FIG. 2. System information distribution component 1018 can disseminate system information to access terminal(s) 1004. For instance, system information distribution component 1018 can broadcast system information. Moreover, change notification component 1020 can page access terminal(s) 1004 camped on base station 1002 for a system update. However, at least a subset of access terminal(s) 1004 can be initially collecting system information from base station 1002, and thus, can fail to receive the page sent by change notification component 1020. Base station 1002 can further include a modulator 1022. Modulator 1022 can multiplex a frame for transmission by a transmitter 1024 through antennas 1008 to access terminal(s) 1004 in accordance with the aforementioned description. Although depicted as being separate from the processor 1014, it is to be appreciated that system information distribution component 1018, change notification component 1020, and/or modulator 1022 can be part of processor 1014 or a number of processors (not shown).

Figure 11:
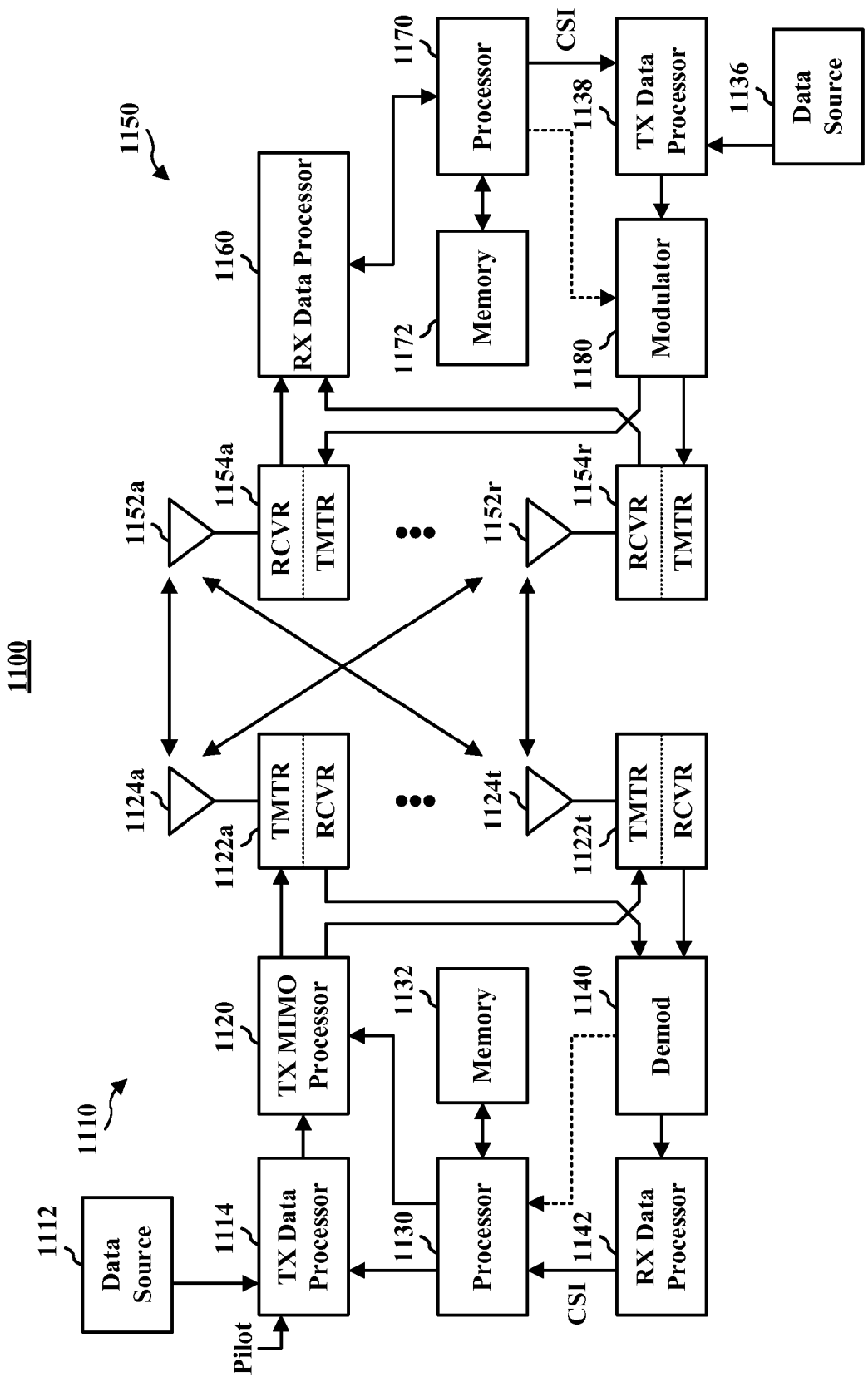
FIG. 11 is an illustration of an example wireless network environment that can be employed in conjunction with the various systems and methods described herein.

FIG. 11 shows an example wireless communication system 1100. The wireless communication system 1100 depicts one base station 1110 and one access terminal 1150 for sake of brevity. However, it is to be appreciated that system 1100 can include more than one base station and/or more than one access terminal, wherein additional base stations and/or access terminals can be substantially similar or different from example base station 1110 and access terminal 1150 described below. In addition, it is to be appreciated that base station 1110 and/or access terminal 1150 can employ the systems (FIGS. 1-3, 9-10, and 12) and/or methods (FIGS. 6-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At access terminal 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from access terminal 1150 are received by antennas 1124, conditioned by receivers 1122, demodulated by a demodulator 1140, and processed by a RX data processor 1142 to extract the reverse link message transmitted by access terminal 1150. Further, processor 1130 can process the extracted message to determine which precoding matrix to use for determining the beamforming weights.

Processors 1130 and 1170 can direct (e.g., control, coordinate, manage, etc.) operation at base station 1110 and access terminal 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
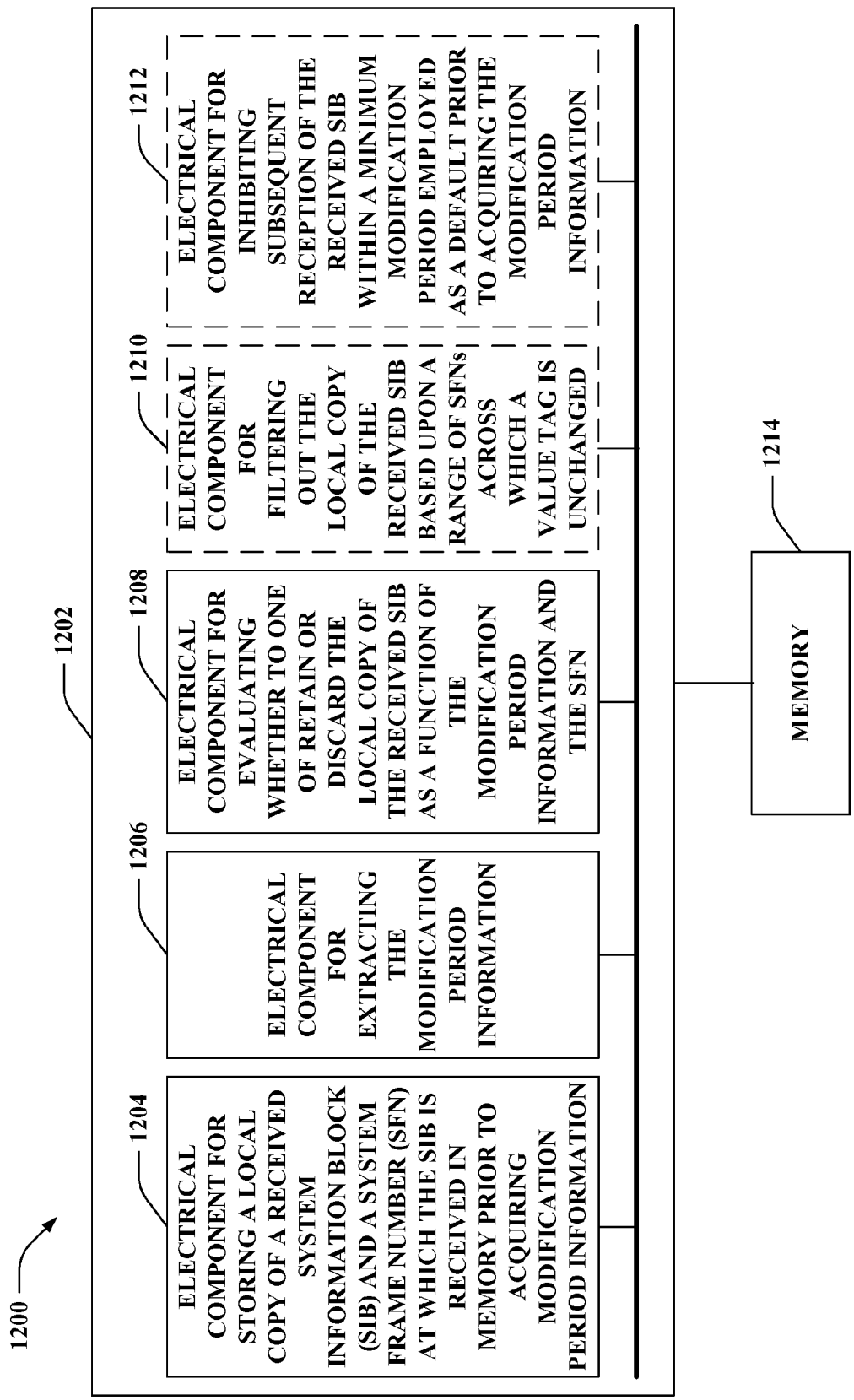
FIG. 12 is an illustration of an example system that enables collecting system information upon entering a cell in a wireless communication environment.

With reference to FIG. 12, illustrated is a system 1200 that enables collecting system information upon entering a cell in a wireless communication environment. For example, system 1200 can reside within an access terminal. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for storing a local copy of a received System Information Block (SIB) and a System Frame Number (SFN) at which the SIB is received in memory prior to acquiring modification period information 1204. Moreover, logical grouping 1202 can include an electrical component for extracting the modification period information 1206. For instance, the modification period information can be extracted from a received SIB2. Further, logical grouping 1202 can include an electrical component for evaluating whether to one of retain or discard the local copy of the received SIB as a function of the modification period information and the SFN 1208. Logical grouping 1202 can also optionally include an electrical component for filtering out the local copy of the received SIB based upon a range of SFNs across which a value tag is unchanged 1210. Further, logical grouping 1202 can optionally include an electrical component for inhibiting subsequent reception of the received SIB within a minimum modification period employed as a default prior to acquiring the modification period information 1212. Additionally, system 1200 can include a memory 1214 that retains instructions for executing functions associated with electrical components 1204, 1206, 1208, 1210, and 1212. While shown as being external to memory 1214, it is to be understood that one or more of electrical components 1204, 1206, 1208, 1210, and 1212 can exist within memory 1214.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates collecting system information in a wireless communication environment, comprising:
   entering a cell;
   receiving a system information block while lacking modification period information;
   maintaining a local copy of the system information block along with a system frame number at which the system information block is received;
   identifying the modification period information subsequent to maintaining the local copy of the system information block; and
   evaluating whether to one of retain or discard the local copy of the system information block as a function of the modification period information and the system frame number.

2. The method of claim 1, further comprising entering the cell during one of cell selection or cell re-selection.

3. The method of claim 1, wherein the modification period information includes at least one of a modification period boundary or a modification period duration.

4. The method of claim 1, further comprising receiving the system information block without knowing whether system information is to be changed in a next modification period.

5. The method of claim 1, further comprising:
   receiving at least one disparate system information block while lacking the modification period information;
   maintaining a local copy of the at least one disparate system information block along with a corresponding respective system frame number pertaining to receipt of the at least one disparate system information block; and
   evaluating whether to one of retain or discard the local copy of the at least one disparate system information block as a function of the modification period information and the corresponding respective system frame number of the at least one disparate system information block.

6. The method of claim 1, further comprising:
   receiving the system information block subsequent to maintaining the local copy of the system information block at a later system frame number; and
   replacing the system information block maintained in the local copy and the system frame number with the system information block received at the later system frame number and the later system frame number.

7. The method of claim 1, further comprising inhibiting subsequent reception of the system information block within a minimum modification period employed as a default prior to identifying the modification period information.

8. The method of claim 1, identifying the modification period information further comprises:
   receiving a system information block type 2; and
   extracting the modification period information from the system information block type 2.

9. The method of claim 1, wherein the local copy of the system information block is discarded when deemed to belong to a previous modification period based upon the modification period information and the system frame number.

10. The method of claim 1, further comprising evaluating whether to one of retain or discard the local copy of the system information block as a function of the modification period information, the system frame number, and a value tag.

11. The method of claim 10, wherein the local copy of the system information block from a previous modification period is retained upon identifying the modification period information when the system information block is unchanged between the previous modification period and a current modification period as recognized by the value tag being unchanged from the previous modification period to the current modification period.

12. The method of claim 10, wherein the local copy of the system information block from a previous modification period is discarded upon identifying the modification period information when the system information block is changed between the previous modification period and a current modification period as recognized by the value tag changing from the previous modification period to the current modification period.

13. The method of claim 10, further comprising maintaining an system frame number range across which the value tag is unchanged.

14. A wireless communications apparatus, comprising:
   a memory that retains instructions related to receiving a system information block while lacking modification period information, storing a local copy of the system information block along with a system frame number at which the system information block is received in the memory, extracting the modification period information subsequent to maintaining the local copy of the system information block, and analyzing whether to one of retain or discard the local copy of the system information block as a function of the modification period information and the system frame number; and
   a processor, coupled to the memory, configured to execute the instructions retained in the memory.

15. The wireless communications apparatus of claim 14, wherein the modification period information includes at least one of a modification period boundary or a modification period duration.

16. The wireless communications apparatus of claim 14, wherein the memory further retains instructions related to receiving at least one disparate system information block while lacking the modification period information, storing a local copy of the at least one disparate system information block along with a corresponding respective system frame number pertaining to receipt of the at least one disparate system information block in the memory, and analyzing whether to one of retain or discard the local copy of the at least one disparate system information block as a function of the modification period information and the corresponding respective system frame number of the at least one disparate system information block.

17. The wireless communications apparatus of claim 14, wherein the memory further retains instructions related to updating the local copy of the system information block and the system frame number when the system information block is received again after being stored in the memory.

18. The wireless communications apparatus of claim 14, wherein the memory further retains instructions related to inhibiting subsequent reception of the system information block within a minimum modification period employed as a default prior to identifying the modification period information.

19. The wireless communications apparatus of claim 14, wherein the memory further retains instructions related to extracting the modification period information from a received system information block type 2.

20. The wireless communications apparatus of claim 14, wherein the local copy of the system information block is discarded when deemed to belong to a previous modification period based upon the modification period information and the system frame number.

21. The wireless communications apparatus of claim 14, wherein the memory further retains instructions related to analyzing whether to one of retain or discard the local copy of the system information block as a function of the modification period information, the system frame number, and a value tag.

22. The wireless communications apparatus of claim 21, wherein the local copy of the system information block from a previous modification period is retained upon identifying the modification period information when the system information block is unchanged between the previous modification period and a current modification period as recognized by the value tag being unchanged from the previous modification period to the current modification period.

23. The wireless communications apparatus of claim 21, wherein the local copy of the system information block from a previous modification period is discarded upon identifying the modification period information when the system information block is changed between the previous modification period and a current modification period as recognized by the value tag changing from the previous modification period to the current modification period.

24. The wireless communications apparatus of claim 21, wherein the memory further retains instructions related to storing an system frame number range across which the value tag is unchanged in the memory.

25. A wireless communications apparatus that enables collecting system information upon entering a cell in a wireless communication environment, comprising:
   means for storing a local copy of a received System Information Block (SIB) and a system frame number at which the system information block is received in memory prior to acquiring modification period information;
   means for extracting the modification period information; and
   means for evaluating whether to one of retain or discard the local copy of the received system information block as a function of the modification period information and the system frame number.

26. The wireless communications apparatus of claim 25, further comprising means for filtering out the local copy of the received system information block based upon a range of system frame numbers across which a value tag is unchanged.

27. The wireless communications apparatus of claim 25, further comprising means for inhibiting subsequent reception of the received system information block within a minimum modification period employed as a default prior to acquiring the modification period information.

28. The wireless communications apparatus of claim 25, wherein the modification period information includes at least one of a modification period boundary or a modification period duration.

29. A computer program product, comprising:
   a computer-readable storage medium comprising:
      code for storing a local copy of a received system information block and a system frame number at which the system information block is received in memory prior to acquiring modification period information;
      code for acquiring the modification period information; and
      code for analyzing whether to one of retain or discard the local copy of the received system information block as a function of the modification period information and the system frame number.

30. The computer program product of claim 29, wherein the computer-readable storage medium further comprises code for analyzing whether to one of retain or discard the local copy of the received system information block as a function of the modification period information, the system frame number, and a value tag.

31. The computer program product of claim 29, wherein the computer-readable storage medium further comprises code for inhibiting subsequent reception of the received system information block within a minimum modification period employed as a default prior to acquiring the modification period information.

32. A wireless communications apparatus, comprising:
   a processor configured to:
      receive a system information block while lacking modification period information;
      maintain a local copy of the system information block along with a system frame number at which the system information block is received;
      identify the modification period information subsequent to maintaining the local copy of the system information block; and
      evaluate whether to one of retain or discard the local copy of the system information block as a function of the modification period information and the system frame number.

* * * * *